(12) United States Patent
Takahashi et al.

(10) Patent No.: US 7,453,214 B2
(45) Date of Patent: Nov. 18, 2008

(54) LAMP-OPERATING UNIT AND LOW-PRESSURE MERCURY DISCHARGE LAMP

(75) Inventors: Akira Takahashi, Osaka (JP); Masayoshi Gyoten, Shiga (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 10/588,619

(22) PCT Filed: Feb. 4, 2005

(86) PCT No.: PCT/JP2005/001698

§ 371 (c)(1),
(2), (4) Date: Aug. 7, 2006

(87) PCT Pub. No.: WO2005/083323

PCT Pub. Date: Sep. 9, 2005

(65) Prior Publication Data

US 2008/0143271 A1    Jun. 19, 2008

(30) Foreign Application Priority Data

Feb. 26, 2004    (JP) .............................. 2004-052389

(51) Int. Cl.
*H01J 7/44* (2006.01)
(52) U.S. Cl. ........................ 315/58; 315/63; 315/209 R; 315/244; 315/227 R; 313/46; 313/493; 313/634
(58) Field of Classification Search .................. 315/56, 315/58, 63, 72, 209 R, 239, 244, 227 R, DIG. 7; 313/46, 318.01, 634, 639, 493; 362/377, 362/378; 363/120, 125
See application file for complete search history.

(56) References Cited

U.S. PATENT DOCUMENTS

| 5,434,478 | A | * | 7/1995 | Kovalsky et al. ........ 315/209 R |
| 5,828,170 | A | | 10/1998 | Nishio et al. |
| 6,252,357 | B1 | | 6/2001 | Tanaka et al. |
| 6,437,502 | B1 | * | 8/2002 | Nishio et al. ................. 313/493 |
| 7,256,547 | B2 | * | 8/2007 | Kubota et al. ................. 315/56 |

FOREIGN PATENT DOCUMENTS

| EP | 0 156 439 | 10/1985 |
| JP | 60-218799 | 1/1985 |
| JP | 61-168509 | 10/1986 |
| JP | 2000-077195 | 3/2000 |
| JP | 2000-82303 | 3/2000 |
| JP | 2003-100103 | 4/2003 |
| JP | 2003-208802 | 7/2003 |

* cited by examiner

*Primary Examiner*—Haissa Philogene

(57) ABSTRACT

The present invention aims to provide an inrush current limiting resistor for suppressing inrush current, and to avoid an excessive current flowing through the inrush current limiting resistor even if the lamp is operated at a dimmed level by mistake. A compact self-ballasted fluorescent lamp 1 is composed of a holder 20 and a case 30 attached to each other. The case 30 houses therein a lighting unit 50 for operating an arc tube 10. The lighting unit 50 is composed of a rectifier/smoothing circuit module having an electrolytic capacitor 53, an inverter circuit module, and a resonant circuit module having a resonance capacitor 54. The circuit modules are mounted on a printed wiring board 51. An inrush current limiting resistor 62 is connected to the input end of the rectifier/smoothing circuit module and in contact with the electrolytic capacitor 53 and the resonance capacitor 54 at their outer circumferential surfaces.

15 Claims, 4 Drawing Sheets

LAMP-OPERATING UNIT AND LOW-PRESSURE MERCURY DISCHARGE LAMP

TECHNICAL FIELD

The present invention relates to a lighting unit for a low-pressure mercury discharge lamp and also to a low-pressure mercury discharge lamp having the lighting unit. Especially, the present invention relates to a lighting unit employing a high frequency inverter.

BACKGROUND ART

In response to the recent movement toward energy conservation, the field of illumination undergoes some changes. Replacing conventionally used incandescent lamps, low-pressure mercury discharge lamps have been increasingly used owing to their high lamp efficiencies and long lives. A compact self-ballasted fluorescent lamp is one example of such low-pressure mercury discharge lamps.

Such a compact self-ballasted fluorescent lamp (hereinafter, referred to simply as a "lamp") is composed generally of an arc tube, a lighting unit for operating the arc tube, and a case for holding the arc tube and housing the lighting unit therein. In addition, a base is connected to one end of the case, for attachment of the lamp to a socket of an illumination fixture and for drawing a power from a commercial power supply.

The lighting unit is of a so-called inverter type. In one example, the lighting unit is generally composed of: a rectifier circuit module having a diode bridge element; an inverter circuit module having a pair of FET elements; and a resonance circuit module having a choke coil, a resonance capacitor, and so on.

Especially, since recent high-frequency inverters invert input of a DC power into a high frequency current, it is more common to use a so-called capacitor input system. According to the capacitor input system, the lighting unit is provided, at the output end of the rectifier circuit module, with a smoothing circuit module having a smoothing capacitor for smoothing an electric current rectified by a diode bride element (See for example, JP patent application publication number 2000-77195). Note that when a lighting unit has both a rectifier circuit module and a smoothing circuit module, the two circuit modules are collectively referred to as a "rectifier/smoothing circuit module".

Some lighting units of the above type is provided with an inrush current limiting resistor at the input end of the rectifier/smoothing circuit module in order to suppress the inrush current drawn by a power supply when it is turned on.

DISCLOSURE OF THE INVENTION

Problems the Invention is going to Solve

Unfortunately, however, a conventional lighting unit has a problem, although the lighting unit is free from such a problem while operating a compact self-ballasted fluorescent lamp at a full brightness level. When the lighting unit operates the lamp at a dimmed level using phase control, the wave form of the current supplied to the rectifier/smoothing circuit module is distorted. As a result, there is undesirable increase in the input current to the smoothing capacitor.

Since conventional incandescent lamps are dimmable using phase control and compact self-ballasted fluorescent lamps are replacements for the incandescent lamps, there is a risk that a compact self-ballasted fluorescent lamp is mounted by mistake to an illumination fixture having a dimming function and operated at a dimmed level.

This is especially problematic in the case of a lighting unit having an inrush current limiting resistor disposed at the input end of rectifier/smoothing circuit module. Dimming operation of the lamp causes an excessive current to flow through the inrush current limiting resistor and thus excessively elevates the temperature of the inrush current limiting resistor. Owing to the recent trend toward downsized lamps, it is often the case where the inrush current limiting resistor is located in the close proximity to the case. With this being the situation, the heat generated within the inrush current limiting resistor causes problems as follows. That is, the case may undergo discoloring or, in a worse case, there is a substantial risk that the case melts at a portion near the inrush current limiting resistor.

JP patent application publication number 2001-284074, for example, discloses a lighting unit that is capable of suppressing the inrush current and dimming operation of the lamp without causing a malfunction. Unfortunately, however, this prior art technique does not employ a capacitor input system. Owing to the difference in the circuit designs, this prior art technique is not applicable to a compact self-ballasted fluorescent lamp employing a capacitor input system.

The present invention is made in view of the above problems, and aims to provide a lighting unit and a low-pressure mercury discharge lamp each having an inrush current limiting resistor for suppressing the inrush current. In addition, each of the lighting unit and the low-pressure mercury discharge lamp according to the present invention is capable of preventing an excessive current flowing through the inrush current limiting resistor, even if the lamp is operated at a dimmed level.

Means for Solving the Problems

In order to achieve the above aims, according to one aspect of the present invention, a lighting unit is for a low-pressure mercury discharge lamp and includes: a rectifier/smoothing circuit module having a smoothing capacitor; an inverter circuit module; a resonance circuit module having a resonance capacitor; a board on which the circuit modules are disposed; and an inrush current limiting resistor connected to an input end of the rectifier/smoothing circuit module. Here, a main body of the inrush current limiting resistor is in contact with or in proximity to a main body outer surface of at least one of the smoothing capacitor and the resonance capacitor.

According to another aspect of the present invention, a low-pressure mercury discharge lamp includes: an arc tube; a lighting unit operable to cause the arc tube to emit light; a tubular case disposed to hold the arc tube and house the lighting unit therein; and a base disposed to cover an end of the case farther away from where the arc tube is held. The lighting unit includes: a rectifier/smoothing circuit module having a smoothing capacitor; an inverter circuit module; a resonance circuit module having a resonance capacitor; a board on which the circuit modules are disposed; and an inrush current limiting resistor connected to an input end of the rectifier/smoothing circuit module. Here, a main body of the inrush current limiting resistor is in contact with or in proximity to a main body outer surface of at least one of the smoothing capacitor and the resonance capacitor.

Note that the "low-pressure mercury discharge lamp" used herein includes, within its scope, not only a compact self-ballasted fluorescent lamp but also a lamp having an arc tube with no phosphor layer inside.

Effects Of The Invention

The lighting unit and the low-pressure mercury discharge lamp according to the present invention are effective when, for example, the lamp is operated at a dimmed level by mistake. Dimming operation of the lamp increases the current flowing through the inrush current limiting resistor, so that the temperature of the inrush current limiting resistor is elevated. The heat generated within the inrush current limiting resistor is conducted to each nearby capacitor to raise the capacitor's temperature. When the respective heat-resistant temperature is exceeded, the capacitor breaks down and the lighting unit stops operating. Consequently, it is avoided that an excessive current flows through the inrush current limiting resistor for a duration that is long enough to cause a change in the external representation of the case housing the lighting unit.

DESCRIPTION OF REFERENCE NUMERALS

1 Lamp
10 Arc Tube
20 Holder
30 Case
40 Base
50 Lighting Unit
51 Printed Wiring Board
52 Choke Coil
53 Electrolytic Capacitor
54 Resonance Capacitor
62 Inrush Current Limiting Resistor

BEST MODE FOR CARRYING OUT THE INVENTION

Hereinafter, a description is given to a compact self-ballasted fluorescent lamp (hereinafter, referred to simply as a "lamp") with reference to the accompanying drawings.

1. Overall Structure of Lamp 1

Figure 1:
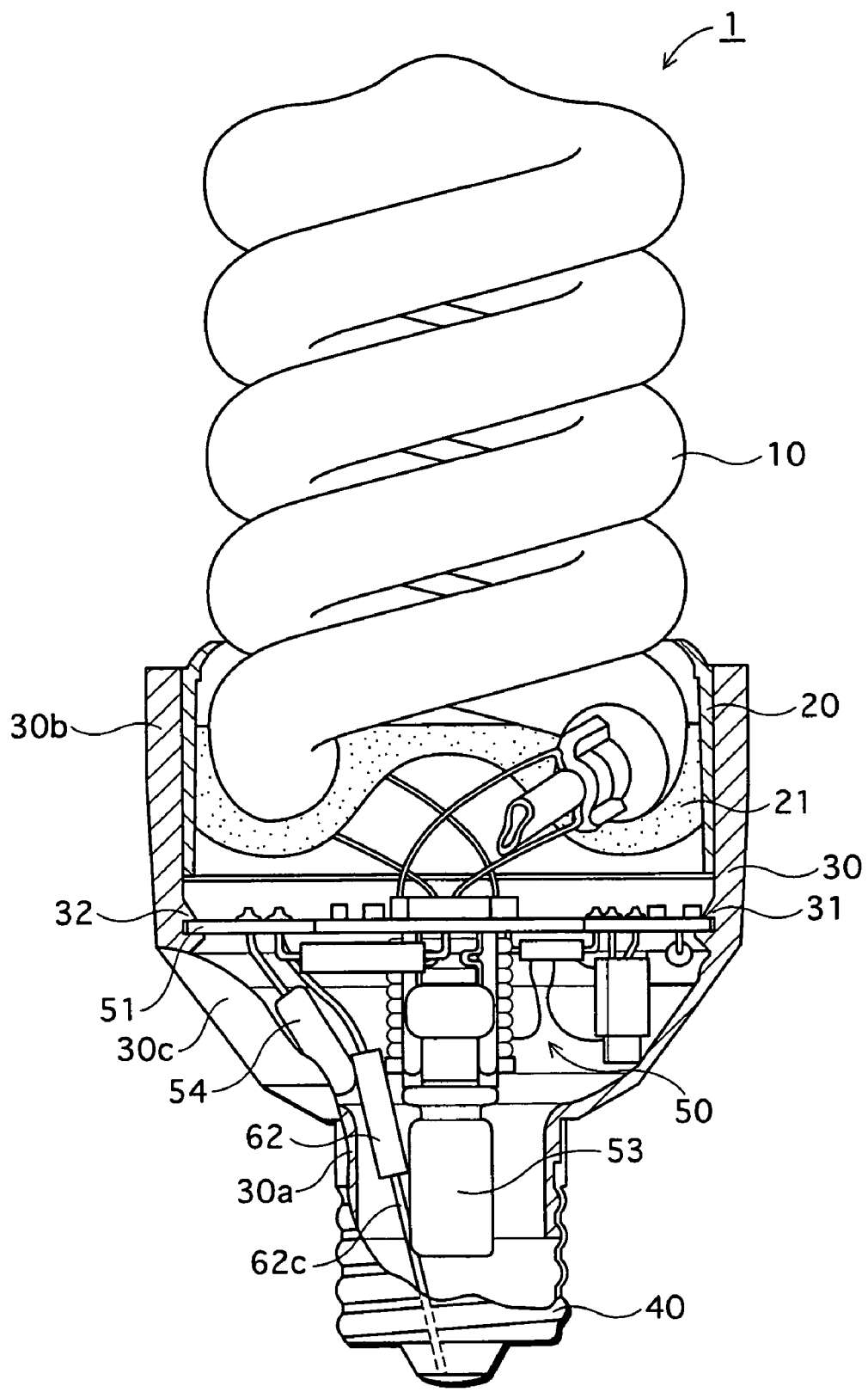
FIG. 1 is a sectional view of a lamp 1 according to an embodiment of the present invention, seen from a side.

FIG. 1 is a sectional view of a lamp 1 seen from the side, with a portion broken away to show the internal structure. The lamp 1 shown in the figure is of a 12 W type, which is usable as a replacement of a 60 W incandescent lamp.

As shown in FIG. 1, the lamp 1 is composed of an arc tube 10 forming a double-spiral discharge path, a holder 20 for holding the arc tube 10, a lighting unit 50 for operating the arc tube 10, and a case 30. The case 30 is attached to a base 40 at one end and houses the holder 20 and the lighting unit 50 therein. The holder 20 and the case 30 together comprise a "case" of the present invention.

The arc tube 10 is composed of a glass tube (of which outside diameter is 9.0 (mm), for example) made of soft glass. The glass tube has a bend substantially at the middle and is formed into the arc tube 10 by spirally wound from the bend toward the respective ends about an axis passing through the bend.

A pair of electrodes (not illustrated) is provided inside the arc tube (discharge path) one at each end thereof, i.e. one at each end of the glass tube. The distance between the pair of electrodes through the discharge path (discharge path length) is designed to be 400 (mm), for example. The inner surface of the arc tube 10 is coated with a phosphor layer and the discharge path is filled with mercury and a mixed gas composed generally of Ar and Ne.

The holder 20 is made of a resin such as PET (polyethylene terephthalate), and has insertion holes (not illustrated) each conforming to the profile of the respective portion of the arc tube 10 where the electrode is provided. The arc tube 10 is partially inserted at each end into the holder 20 through the insertion holes, and fixed in place within the holder 20 using a resin 21, such as a silicon resin.

The case 30 is made of PBT (polybutylene terephthalate), for example. The case 30 is composed of a small diameter portion 30a, a large diameter portion 30b which is larger in diameter than the small diameter portion 30a, and a tapered portion 30c gradually and externally tapered from the small diameter portion 30a to the large diameter portion 30b. That is, the case 30 has a funnel-shape.

The holder 20 is fitted within the large diameter portion 30b of the case 30, whereas the base 40 is fitted over the small diameter portion 30a. In the description given herein, the holder 20 is fitted within the large diameter portion 30b of the case 30. Yet, the case and the holder may be an integral one piece.

That is, the case of the present invention is without limitation in the specific number of components, shapes, and so on. Any case is applicable as long as the case holds the arc tube, has a small diameter portion covered by the base, and houses the lighting unit therein.

The base 40 may be an externally threaded metal tube. In this embodiment, an E17 base is used. Yet, this specific type of base is mentioned merely as an example without limitation. The base 40 may be an E26 base or a B-shape base.

The lighting unit 50 housed within the case 30 is composed of a plurality of electronic components mounted on a printed wiring board 51 with a predetermined wiring pattern formed on the main surface. As shown in FIG. 1, the printed wiring board 51 is latched at the rim to the case 30 with latching members 31 and 32, so that the printed wiring board 51 stays in place within the case 30.

2. Circuit Design of Lamp

Figure 2:
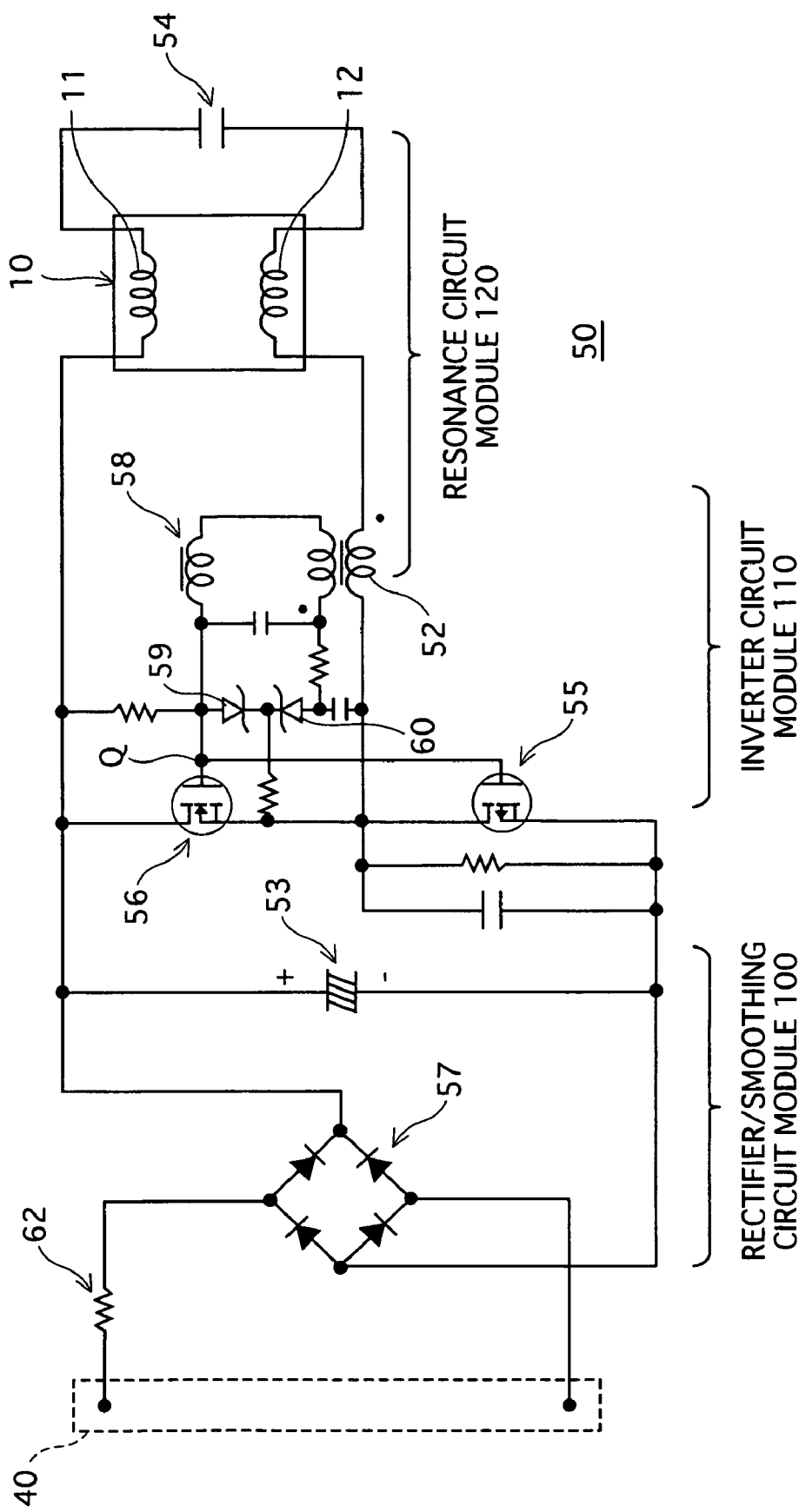
FIG. 2 is a circuit diagram of the lamp 1 including a lighting unit 50.

FIG. 2 is a circuit diagram showing circuitry of the lamp 1 having the lighting unit 50.

The lighting unit 50 is mainly composed of a rectifier/smoothing circuit module 100, an inverter circuit module 110, and a resonance circuit module 120.

The rectifier/smoothing circuit module 100 converts a commercially available low-frequency alternating current into a direct current by rectifying and smoothing. In one example, the rectifier/smoothing circuit module 100 is composed generally of a diode bridge element 57 and an electrolytic capacitor 53 for smoothing. In other words, the lighting unit 50 has circuitry of a capacitor input system.

The lighting unit 50 is connected via the base 40 to a commercially available low-frequency AC power source. An inrush current limiting resistor 62 is connected between the base 40 and the rectifier/smoothing circuit module 100. More specifically, the inrush current limiting resistor 62 is connected to the input end of the rectifier/smoothing circuit module 100.

The inrush current limiting resistor 62 suppresses the inrush current drawn by the power source when it is turned on, in the case where, for example, the lamp 1 is attached by mistake to an illumination fixture of which the rated application voltage differs from that of the lamp 1.

The inverter circuit module 110 inverts the direct current output from the rectifier/smoothing circuit module 100 into a high frequency current. In one example, the inverter circuit module 110 is composed generally of a pair of PMOS-FET element 55 and nMOS-FET element 56 acting as a switching element, Zener diode elements 59 and 60 for protection of the FET elements 55 and 56, and a coil 58 that has the later-described functions.

The resonance circuit module 120 is connected to the output end of the inverter circuit module 110. The resonance circuit module 120 is used to apply the turnover voltage at a predetermined frequency to the pair of FET elements 55 and 56 of the inverter circuit module 110. The inverter circuit module 110 is composed generally of a choke coil 52 and a resonance capacitor 54. Note that the coil 58 acts as a secondary coil of the choke coil 52.

Here, a brief description is given to operations of the inverter circuit module 110 and the resonance circuit module 120. First, when an electric current of a predetermined direction is applied to the choke coil 52, an electromotive force is produced through the coil 58 acting as the secondary coil, in accordance with the current flowing through the choke coil 52. The electromotive force is applied as a turnover voltage to the gates of the FET elements 55 and 56 connected to the Q-point. As a result, a predetermined high-frequency current is applied to the electrodes 11 and 12 (See, FIG. 2) provided within the arc tube 10.

3. Structure and Arrangement of Lighting Unit Components

Figure 3:
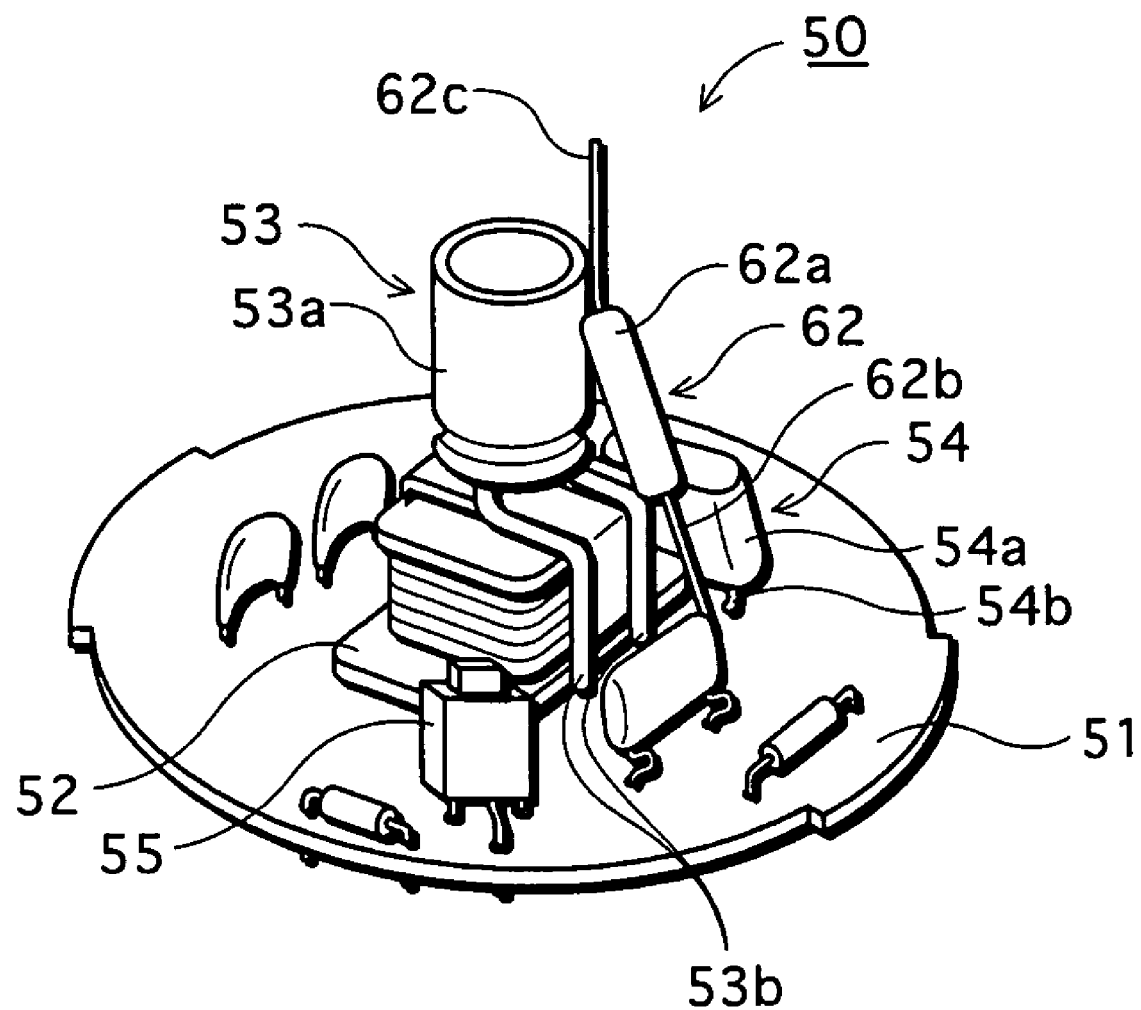
FIG. 3 is an oblique view showing the arrangement of components constituting the lighting unit.

FIG. 3 is an oblique view showing the arrangement of components constituting the lighting unit 50.

In the lighting unit 50, the electric and electronic components 52-60 constituting the above-described circuit modules are appropriately mounted on the front and back surfaces of the printed wiring board 51. The surface of the printed wiring board 51 facing toward the base 40 is referred to as the front surface. Thus, the front surface of the printed wiring board 51 in FIG. 1 is the underside, whereas the front surface of the printed wiring board 51 in FIG. 3 is the upper side.

Most of the above-described components are individually provided with a pair of lead wires extending from the respective main bodies. The ends of the lead wires are inserted into insertion holes provided through the printed wiring board 51 and soldered to the back surface of the printed wiring board 51. In this manner, the electronic and electron components (hereinafter, referred to simply as "components") are mounted and electrically connected to the printed wiring board 51.

As shown in FIG. 3, the components mounted on the front surface of the printed wiring board 51 include the choke coil 52, the electrolytic capacitor 53, the resonance capacitor 54, and the pMOS-FET element 55.

Among the components mentioned above, the choke coil 52 occupies a relatively large volume. Thus, the choke coil 52 is arranged substantially at the center of the front surface of the printed wiring board 51, as shown in FIG. 3. The electrolytic capacitor 53 is arranged closer to the base 40 than the choke coil 52 is to the base 40.

The electrolytic capacitor 53 is composed of a columnar main body 53a and a pair of lead wires 53b extending from one end face (undersurface) of the main body 53a. For example, the electrolytic capacitor 53 complies with the specifications of 16 (V) and 12 (μF).

The electrolytic capacitor 53 is arranged such that the pair of lead wires 53b bends closely along the choke coil 52 and that the main body 53a is located above the choke coil 52 (farther away from the printed wiring board 51 in a direction perpendicular to the front surface of the printed wiring board 51).

The electrolytic capacitor 53 is arranged above the choke coil 52 because of its low heat resistance relative to the other components of the lighting unit 50 (for example, the operating temperature of 110° C. or lower). As shown in FIG. 1, when the lighting unit 50 is attached to the case 30, the main body 53a of the electrolytic capacitor 53 is housed substantially entirely within an inner space of the mounting portion of the base 40. The mounting portion undergoes the least temperature rise during the time the lamp 1 is operated. Note that it is also applicable that the main body 53a is housed within the inner space only partially, although it is described above that the main body 53a of the electrolytic capacitor 53 is housed substantially entirely.

The inrush current limiting resistor 62 is composed of a columnar main body 62a and a pair of lead wires 62b and 62c extending from the main body 62a. For example, the inrush current limiting resistor 62 complies with the specifications of 4.7 (Q). One of the lead wires 62b is connected to the printed wiring board 51, whereas the other lead wire 62c is connected to the base 40. Note that there is a lead wire connecting the base 40 and the printed wiring board 51, but not illustrated in the figure.

Figure 4:
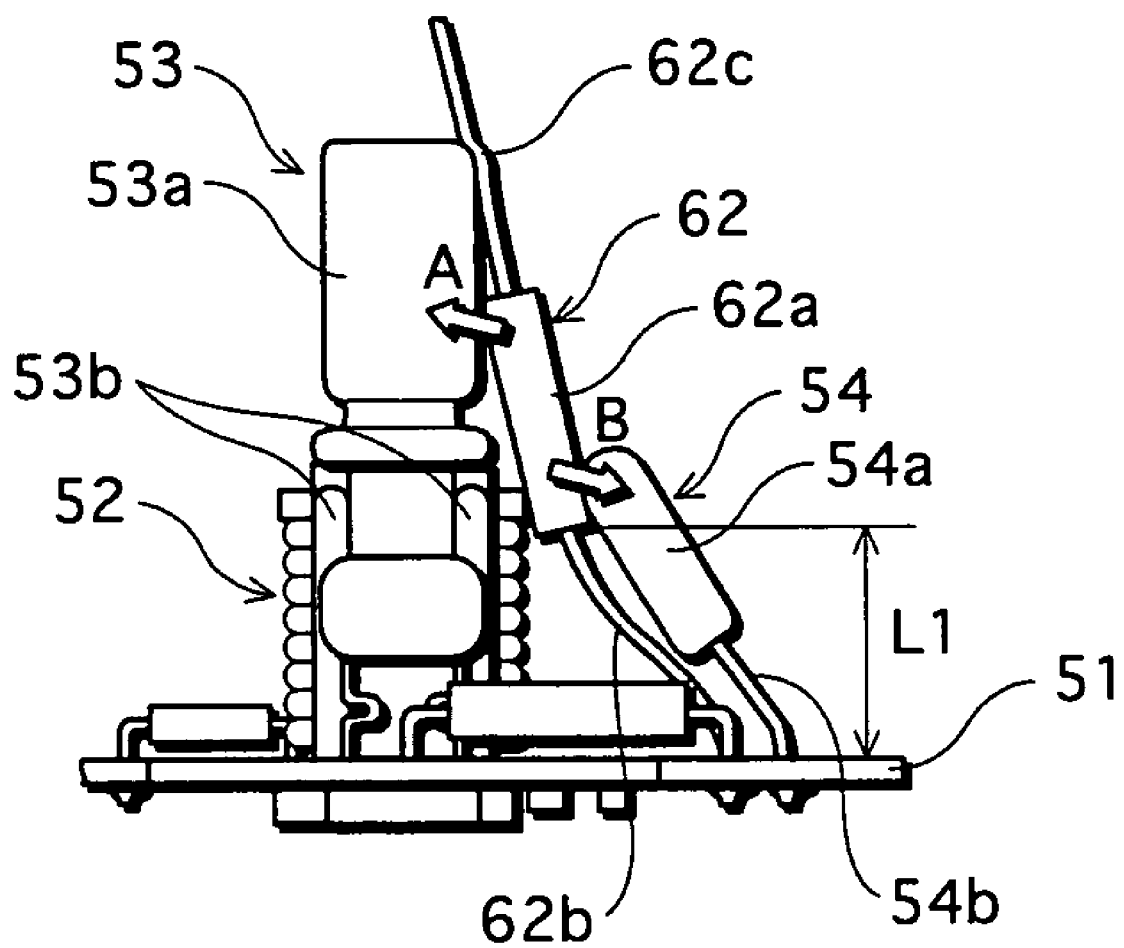
FIG. 4 is an enlarged view of a portion of the lighting unit in the proximity of an inrush current limiting resistor.

The inrush current limiting resistor 62 is mounted on the printed wiring board 51, so that the upper portion (the portion closer to the base 40) of the main body 62a is in contact with the outer circumferential surface of the main body 53a of the electrolytic capacitor 53. More specifically, the lead wire 62b of the inrush current limiting resistor 62 is upwardly inclined toward the choke coil 52 (i.e. the lead wire 62b is inclined toward the choke coil 52 in a direction perpendicularly away from the front surface of the printed wiring board 51). As shown in FIG. 4, the distance L1 between the front surface of the printed wiring board 51 and the end, closer to the printed wiring board 51, of the main body 62a of the inrush current limiting resistor 62 measures 20 (mm).

As shown in FIG. 1, in addition, the lead wire 62c of the inrush current limiting resistor 62 extends to the base 40 through a space present between the main body 53a of the electrolytic capacitor 53 and the inner circumferential surface of the small diameter portion 30a of the case 30. A portion of the main body 62a of the inrush current limiting resistor 62 closer to the lead wire 62c is located between the electrolytic capacitor 53 and the inner circumferential surface of the small diameter portion 30a, and is in contact with the main body 53a of the electrolytic capacitor 53.

As shown in FIGS. 3 and 4, the resonance capacitor 54 is composed of a main body 54a and a pair of lead wires 54b extending from the main body 54a. In one example, the resonance capacitor 54 is a polyester capacitor having the capacity of 5600 (pF) and is arranged in the proximity to the choke coil 52.

The outer circumferential surface of the main body 54a of the resonance capacitor 54 is in contact with the circumferential surface of the lower portion (the portion closer to the printed wiring board 51) of the main body 62a of the inrush current limiting resistor 62. More specifically, the contact is made as shown in FIG. 4 by bending the lead wire 54b to incline the main body 54a of the resonance capacitor 54 toward the choke coil 52 until the upper portion (the end portion farther away from the lead wire 54b) of the main body 54a is brought into contact with the inrush current limiting resistor 62. Here, the main body 54a of the resonance capacitor 54 extends along the inner surface of the tapered portion 30c of the case 30.

As described above, the main body 62a of the inrush current limiting resistor 62 and the main body 54a of the resonance capacitor 54 are inclined toward the axis of the lamp 1 in a direction perpendicularly away from the front surface of the printed wiring board 51. The reason for this arrangement is to provide contact between the electrolytic capacitor 53, the inrush current limiting resistor 62, and the resonance capacitor 54. Another reason is for ensuring compact housing of those components into the funnel-shaped case 30.

Note that the components, such as the Zener diode elements 59 and 60, other than the choke coil 52, the electrolytic capacitor 53, the inrush current limiting resistor 62, and the resonance capacitor 54 are disposed around the choke coil 52.

4. Operation of Lamp

Since the operation of the lamp 1 having the above-described structure is known in the art, a description thereof is given briefly with reference to FIG. 2.

When an AC power is supplied from a commercially available low-frequency power source to the lamp 1 via the base 40, the AC power is once converted into a DC power by the rectifier/smoothing circuit module 100, and the DC power is applied to the gate of the nMOS-FET element 56. As a result, the power is applied to the electrodes 11 and 12 via the choke coil 52. Here, the current flowing through the choke coil 52 causes the coil 58 acting as the secondary coil of the choke coil 52 to produce an electromotive force. This electromotive force is applied as a turnover voltage alternatively to the gates of the FET elements 55 and 56 connected to the Q-point. Consequently, a predetermined high frequency current is supplied to the electrodes 11 and 12 of the arc tube 10. Note that once the electrodes 11 and 12 start an electric discharge, the arc tube 10 has negative impedance. Thus, by limiting the supplying current from the lighting unit 50, the electric discharge is sustained.

5. Abnormal Operation of Lamp

Here, a discussion is given with reference to FIG. 4 to the case where the lamp 1 having the above-described structure is mounted to an illumination fixture having a dimming function using phase control. FIG. 4 shows an enlarged view of a portion of the lighting unit in the proximity to an inrush current limiting resistor.

When the lamp 1 is turned on at a dimmed level using phase control, the current flowing through the inrush current limiting resistor 62 of the lighting unit 50 surges and the temperature of the inrush current limiting resistor 62 rises, as described in the above "Problems the Invention is going to Solve" section.

As shown in FIG. 4, the main body 62a of the inrush current limiting resistor 62 is in contact with the main body 53a of the electrolytic capacitor 53 at its upper portion and with the main body 54a of the resonance capacitor 54 at its lower portion. This structure allows, when the temperature of the inrush current limiting resistor 62 rises high, the heat accumulated in the inrush current limiting resistor 62 is conducted to the electrolytic capacitor 53 as indicated by an arrow A in FIG. 4, and also to the resonance capacitor 54 as indicated by an arrow B in the figure.

While the lamp 1 remains operated at a dimmed level, the waveform of the voltage applied to the rectifier/smoothing circuit module 100 starts to be distorted, which elevates the temperature of the inrush current limiting resistor 62 even higher. Consequently, the heat of the inrush current limiting resistor 62 at elevated temperatures is conducted to both the electrolytic capacitor 53 and the resonance capacitor 54. As a result, the temperatures of the respective capacitors 53 and 54 rise further.

Finally, the temperatures of the electrolytic capacitor 53 and the resonance capacitor 54 reach their respective heat-resistant temperatures, such as 110 (° C.) for example. At a point when the respective heat-resistant temperatures are exceeded, the heat breaks down the capacitors 53 and 54.

For example, when the electrolytic capacitor 53 breaks down, the capacity drops significantly and thus the charging current supplied to the electrolytic capacitor 53 drops. On the other hand, when the resonance capacitor 54 breaks down, the resonance operation with the choke coil 52 comes to stop, and thus no more turnover voltage is applied to the FET elements 55 and 56 of the inverter circuit module 110. As a result, the inverter circuit module 110 and the resonance circuit module 120 stop operating. In either case, the electrolytic capacitor 53 is put into the open state, and thus the electric discharge is ceased and the charging current to the electrolytic capacitor 53 decreases.

As described above, when either of the electrolytic capacitor 53 and the resonance capacitor 54 breaks down, the charging current to the electrolytic capacitor 53 decreases. Naturally, the current flowing through the inrush current limiting resistor 62 decreases as well. As a result, the heat generation in the inrush current limiting resistor 62 decreases, which prevents the temperature from elevating any further.

It should be noted here that the heat-resistant temperature (250 (° C.)) of the case 30 used in the present embodiment is higher than the heat-resistant temperatures (110 (° C.)) of the electrolytic capacitor 53 and the resonance capacitor 54. With this arrangement, even in the case where the inrush current limiting resistor 62 starts to generate abnormally high heat, the electrolytic capacitor 53 and/or the resonance capacitor 54 break down before a problem, such as discoloration, is caused to the case 30.

As set forth above, heat-producing components, such as the inrush current limiting resistor 62, the electrolytic capacitor 53, and the resonance capacitor 54 are arranged in proximity to the inner circumferential surfaces of the case 30. In addition, the heat-producing components are arranged at an effectively high component density, so that the case 30 can be downsized.

MODIFICATIONS

Up to this point, the present invention has been described by way of the above embodiment. Yet, it should be naturally appreciated that the present invention is in no way limited to the specific embodiment described above. Various modifications including the following may be made.

1. Regarding Lamp

In the above embodiment, the compact self-ballasted fluorescent lamp of the 12 W type is mentioned but merely as an example and without limiting the lamp to any specific type, size, and so on. In addition, it goes without saying that electronic components constituting the lighting unit are not limited to the specific ones mentioned in the above embodiment. The electronic components may be of any rating and type as long as the inrush current limiting resistor 62 is in contact with at least one of the electrolytic capacitor 53 and the resonance capacitor 54.

According to the above embodiment, in addition, the arc tube is composed of a glass tube having an electrode with filament sealed at each end thereof. Yet, the present invention may be applicable to a so-called electrodeless lamp that uses an induced magnetic field.

According to the above embodiment, the arc tube has the shape of a double spiral. Naturally, however, any other shape may be applicable. For example, the arc tube may have a U-shape formed by bending a single glass tube, a so-called saddle shape formed by further bending such a U-shaped glass tube, or a shape formed by connecting a plurality of, for example two or three, such U-shaped glass tubes.

3. Regarding Distance Between Inrush Current Limiting Resistor and Capacitors

According to the above embodiment, the inrush current limiting resistor is in contact with both the electrolytic capacitor and the resonance capacitor. Yet, it is not necessary that the inrush current limiting resistor is in contact with the capacitors, as long as more heat is conducted to the capacitors than to the case when the inrush current limiting resistor generates heat. More specifically, it is sufficient that the inrush current limiting resistor is in proximity to the electrolytic capacitor and/or the resonance capacitor. This arrangement still ensures that the temperatures of the capacitors are higher than the temperature of the inner circumferential surface of the case at all times, so that the capacitors will break down before the heat causes discoloring of the case.

4. Regarding Globe Housing Arc Tube

According to the above embodiment, the lamp is of a so-called D type, which is a type of lamp not provided with a globe housing the arc tube. Yet, the present invention may be applicable to a lamp having a globe, which is a lamp of a type A, T, or G, for example.

5. Additional Notes

According to the above embodiment, the inrush current limiting resistor is in contact with both the electrolytic capacitor and the resonance capacitor. Yet, the principles of the present invention are embodied as long as one of the capacitors is in contact with the inrush current limiting resistor. Yet, for better safety and reliability, it is preferable that both the capacitors are in contact with the inrush current limiting resistor.

Moreover, the heat-resistant temperature of the case is not limited to the specific value mentioned above. It is sufficient that the case withstands heat to an extent not causing any problem, such as discoloration, when the electrolytic capacitor or the resonance capacitor breaks down due to the heat generated within the inrush current liming resistor.

To be more specific, according to the above embodiment, the case 30 can withstand temperatures up to 250 (° C.) and the electrolytic capacitor 53 can withstand temperatures up to 110 (° C.). The different between the respective heat-resistant temperatures is 140 (° C.). Yet, it should be sufficient that the difference is at least 30 (° C.), although there may be some deviation owing to the degree of the contact between the inrush current limiting resistor 62 and the electrolytic capacitor 53, fluctuations in the current flowing through the inrush current limiting resistor 62, the shape of the case, and the distance between the inrush current limiting resistor and the case. There may be a case where the heat-resistant temperatures need to be determined in view of the electrolytic capacitor or the resonance capacitor actually used.

INDUSTRIAL APPLICABILITY

The present invention is applicable to a lighting unit and a low-pressure mercury discharge lamp each capable of suppressing abnormal heat generation in the inrush current limiting resistor.

The invention claimed is:

1. A lighting unit for a low-pressure mercury discharge lamp, comprising:
 a rectifier/smoothing circuit module having a smoothing capacitor;
 an inverter circuit module;
 a resonance circuit module having a resonance capacitor;
 a board on which the circuit modules are disposed; and
 an inrush current limiting resistor connected to an input end of the rectifier/smoothing circuit module, wherein
 a main body of the inrush current limiting resistor is in contact with or in proximity to a main body outer surface of at least one of the smoothing capacitor and the resonance capacitor.

2. The lighting unit according to claim 1, wherein
 the main body of the smoothing capacitor is farther away from the board than the main body of the resonant capacitor is from the board, and
 the main body of the inrush current limiting resistor is in contact with or in proximity to the main body of the smoothing capacitor at an end farther away from the board, and in contact with or in proximity to the main body of the resonance capacitor at an end closer to the board.

3. A low-pressure mercury discharge lamp, comprising:
 an arc tube;
 a lighting unit operable to cause the arc tube to emit light;
 a tubular case disposed to hold the arc tube and house the lighting unit therein; and
 a base disposed to cover an end of the case farther away from where the arc tube is held; wherein
 the lighting unit includes:
  a rectifier/smoothing circuit module having a smoothing capacitor;
  an inverter circuit module;
  a resonance circuit module having a resonance capacitor;
  a board on which the circuit modules are disposed; and
  an inrush current limiting resistor connected to an input end of the rectifier/smoothing circuit module, and
 a main body of the inrush current limiting resistor is in contact with or in proximity to a main body outer surface of at least one of the smoothing capacitor and the resonance capacitor.

4. The low-pressure mercury discharge lamp according to claim 3, wherein
 said at least one of the capacitors is the smoothing capacitor,
 the smoothing capacitor and a choke coil that is included in the resonance circuit module are aligned axially of the case, with the choke coil disposed closer to the arc tube, and
 the inrush current liming resistor and the smoothing capacitor are in contact with or in proximately to each other at the respective main body outer surfaces.

5. The low-pressure mercury discharge lamp according to claim 4, wherein
 the main body of the inrush current liming resistor is in contact with or in proximity to the main body of the smoothing capacitor at an end farther away from the arc tube, and in contact with or in proximity to the main body of the resonance capacitor at an end closer to the arc tube.

6. The low-pressure mercury discharge lamp according to claim 4, wherein
 the case is composed of a small diameter portion to which the base is disposed, a large diameter portion being larger in diameter than the small diameter portion, and a tapered portion externally tapered from the small diameter portion to large diameter portion, the board is disposed within the large diameter portion, so that a main surface of the board is perpendicular to the axis of the case, and the main body of the smoothing capacitor is at least partially located within the base.

7. The low-pressure mercury discharge lamp according to claim 5, wherein the case is composed of a small diameter portion to which the base is disposed, a large diameter portion being larger in diameter than the small diameter portion, and a tapered portion externally tapered from the small diameter portion to large diameter portion, the board is disposed within the large diameter portion, so that a main surface of the board is perpendicular to the axis of the case, and the main body of the smoothing capacitor is at least partially located within the base.

8. The low-pressure mercury discharge lamp according to claim 6, wherein the inrush current limiting resistor has a pair of lead wires extending one from either end of the main body, one of the lead wires extends through a space present between the smoothing capacitor and an inner surface of the small diameter portion, and connects to the base, and the inrush current limiting resistor is inserted within the space so as to be in contact with the smoothing capacitor.

9. The low-pressure mercury discharge lamp according to claim 7, wherein the inrush current limiting resistor has a pair of lead wires extending one from either of opposing ends of the main body, one of the lead wires extends through a space present between the main body of the smoothing capacitor and an inner surface of the small diameter portion, and connects to the base, and the inrush current limiting resistor is inserted within the space so as to be in contact with the smoothing capacitor.

10. The low-pressure mercury discharge lamp according to claim 6, wherein, the main body of the resonance capacitor is inclined along the tapered portion, so as to be in contact with or in proximity to the inrush current resistor.

11. The low-pressure mercury discharge lamp according to claim 7, wherein, the main body of the resonance capacitor is inclined along the tapered portion, so as to be in contact with or in proximity to the inrush current resistor.

12. The low-pressure mercury discharge lamp according to claim 8, wherein the main body of the resonance capacitor is inclined along the tapered portion, so as to be in contact with or in proximity to the inrush current resistor.

13. The low-pressure mercury discharge lamp according to claim 9, wherein the main body of the resonance capacitor is inclined along the tapered portion, so as to be in contact with or in proximity to the inrush current resistor.

14. The low-pressure mercury discharge lamp according to claim 3, wherein the case and the smoothing capacitor differ in heat-resistant temperature at least by 30° C.

15. The low-pressure mercury discharge lamp according to claim 13, wherein the case and the smoothing capacitor differ in heat-resistant temperature at least by 30° C.

* * * * *